UNITED STATES PATENT OFFICE.

THOMAS BAILEY WALKER, OF AUSTIN, TEXAS.

STOCK FOOD.

1,155,531. Specification of Letters Patent. Patented Oct. 5, 1915.

No Drawing. Application filed February 5, 1913. Serial No. 746,411.

*To all whom it may concern:*

Be it known that I, THOMAS BAILEY WALKER, a citizen of the United States, residing at Austin, in the county of Travis and State of Texas, have invented certain new and useful Improvements in Stock Food, of which the following is a specification.

This invention relates to the process of manufacturing stock feed from wood and the product resulting from said process.

The object of my invention is to produce at a low cost a complete stock food product that will be palatable to herbivorous animals, and nourishing and flesh building.

With this object in view, my invention consists in the matters to be hereinafter described and claimed.

In carrying my invention into practical effect I crush or grind any suitable wood (sawdust may be used), including the bark, then leach it in the ordinary way to remove the tannin. After the removal of the tannin from one to two per cent. of ground malt is added in a watery mixture, and the mass is carefully heated to a temperature of 150° to 160° for from one to two hours, thereby converting a certain per cent. of the cellulose products into products which can be digested by an animal in feeding. This mass is then treated with a suitable acid liquor and heated under pressure, in the usual way, to convert a percentage of the cellulose into hydrolyzed bodies, such as sugar, and in process of heating I drive off the excess of resin, thereby improving the palatability of the food. After neutralization with an alkali the saccharine liquid is pumped off and evaporated to the consistency of a syrup, which is then added to the treated wood product, which produces a food having almost the food value of a sorghum variety of cane. When the woody material, on account of the bark content, is low in cellulose, resulting in a small yield of syrup, the saccharine content of the mass may be brought up by the addition of a low grade of centrifugal molasses which may be obtained from the refineries at small cost. To the mass, as so far described, cotton seed meal is added in about the proportion of one part meal to four or five of the converted wood meal, and the addition of a small per cent. of salt renders the food so palatable to cattle that it is eaten eagerly, and they rapidly take on flesh and weight.

By a careful series of feeding experiments it has been shown that given quantities of prepared saccharated wood meal and cotton seed meal when fed separately do not lead to that increase in weight of the animal as when a combination of the two are fed in suitable proportions. It has been found that cotton seed meal is much more efficient as an admixture to the prepared wood meal than any other variety of oil cakes or meal, and of all tried the cotton seed meal was found most particularly suitable for the purpose.

By using hydrochloric acid in this process, instead of sulfuric or sulfurous acid, and neutralizing with caustic soda, I obtain salt which makes the food more palatable than when lime is used as a neutralizing agent.

I do not confine myself strictly to the proportions herein given, as they will vary according to the proportion of sugar contained in various woods which may be employed, and also according to the food value of the cellulose in different woods and according to which class of animals to be fed.

Claims:

1. That process of making stock food which consists in leaching wood particles, adding thereto a small per cent. of ground malt, and subjecting the same to heat, then treating the mass with acid liquors under pressure to produce hydrolyzed wood cellulose, then neutralizing with an alkali, finally drawing off and evaporating the liquid to the consistency of a syrup, and returning this to the mass.

2. That process of making stock food which consists in leaching wood particles, adding thereto a small per cent. of ground malt, and subjecting the same to heat, then treating the mass with acid liquors under pressure to produce hydrolyzed wood cellulose, then neutralizing with an alkali, then drawing off and evaporating the liquid to the consistency of a syrup, and returning this to the mass, and finally adding a proportion of cotton seed meal.

3. A stock food comprising malt treated and hydrolyzed cellulose.

4. A stock food comprising malt treated and hydrolyzed cellulose, and cotton seed meal.

5. A stock food comprising malt treated and hydrolyzed cellulose, cotton seed meal, and molasses.

In testimony whereof I affix my signature in presence of two witnesses.

THOMAS BAILEY WALKER.

Witnesses:
C. A. NEALE,
C. E. FETZER.